United States Patent

Lee, Jr.

[15] 3,660,600

[45] May 2, 1972

[54] PATH FINDING SYSTEM FOR MULTI-STAGE SWITCHING MATRIX

[72] Inventor: Ernest O. Lee, Jr., Fairport, N.Y.

[73] Assignee: Stromberg-Carlson Corporation, Rochester, N.Y.

[22] Filed: May 15, 1970

[21] Appl. No.: 37,772

[52] U.S. Cl. .......................................179/18 EA, 179/18 GE

[51] Int. Cl. .......................................................H04q 3/54

[58] Field of Search..................................179/18 ES, 18 EA

*Primary Examiner*—William C. Cooper

*Attorney*—Craig, Antonelli & Hill

[57] ABSTRACT

System for obtaining a free path through a multi-stage switching matrix from a marked input to one of a plurality of junctors or trunks at an output of the network wherein scanning is provided at the outputs of the first stage switch which includes the marked input, the inputs of all third stage switches are monitored to detect the scanning signals on available lines, and the availability of the required junctors or trunks is then correlated to the monitored information at the third stage inputs so as to simultaneously allot a junctor or trunk and select a free path connectable thereto.

30 Claims, 9 Drawing Figures

Patented May 2, 1972 3,660,600
6 Sheets-Sheet 1
FIG. 1 SYSTEM BLOCK DIAGRAM - EPBX
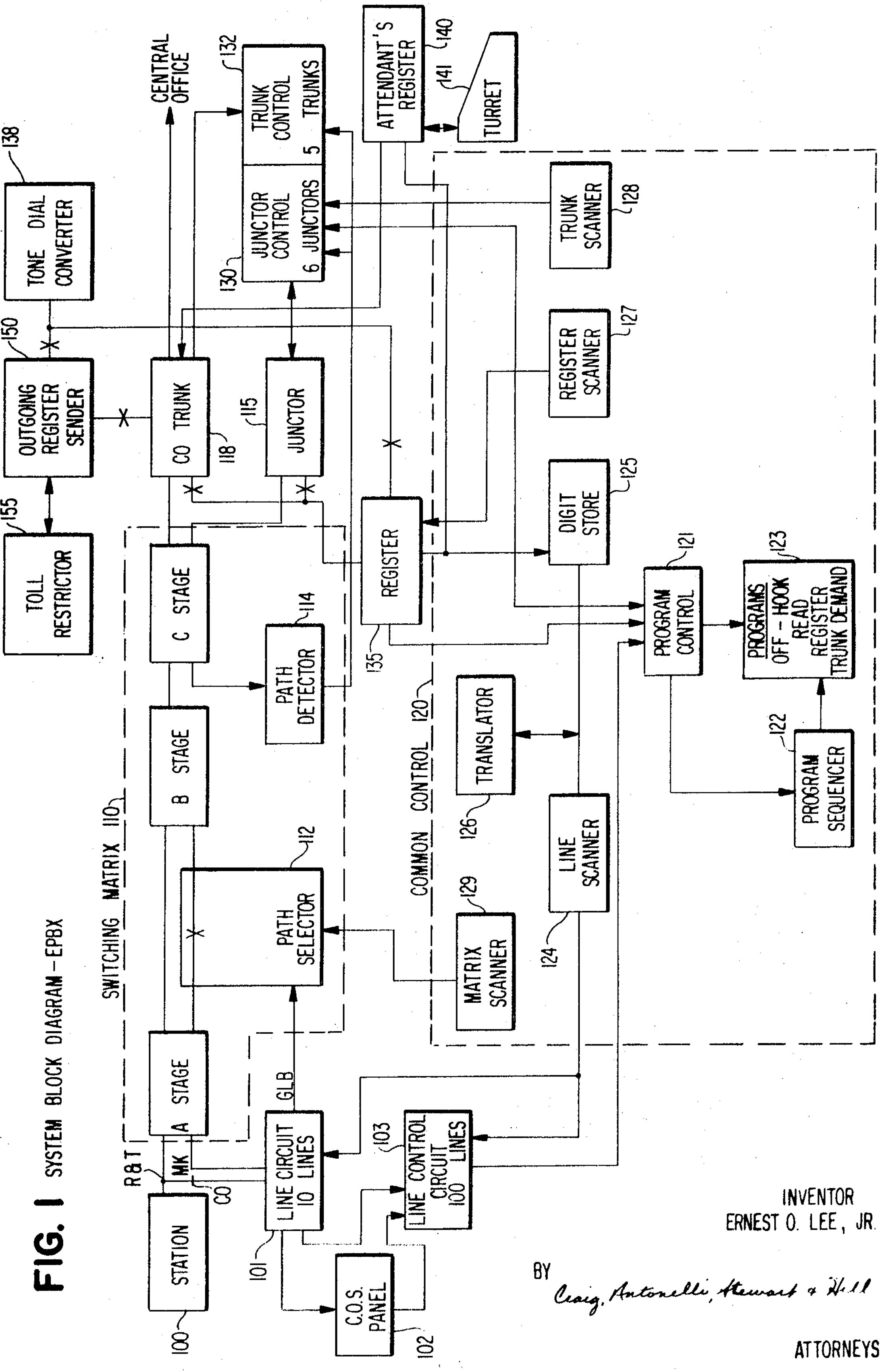
INVENTOR
ERNEST O. LEE, JR.
BY Craig, Antonelli, Stewart & Hill
ATTORNEYS

PATH FINDING SYSTEM FOR MULTI-STAGE SWITCHING MATRIX

The present invention relates in general to telephone systems, and more particularly to a system for determining the availability of and for selecting a unique path through a multi-stage switching matrix to provide connection between a calling station and a called station or an outgoing trunk circuit, or between an incoming trunk and a called station.

In common control telephone systems wherein connection between a calling station and a called station or outgoing trunk is effected through a multi-stage switching matrix providing a plurality of possible paths between a given input and a given output thereof, it is necessary to provide a path checking and selecting system in connection with the switching matrix to determine the availability of the various interstage links which make up the possible paths through the matrix and to select a combination of such links which will provide an available path from a given input to a given output thereof. Various systems capable of performing such a path finding operation have been provided wherein scanning of selected links between the respective stages of the switching matrix in a progressive manner forms the basis for determining a free path through the switching matrix. In the switching systems associated with a large central office such path finding arrangements are necessarily complex requiring step-by-step scanning of successive stages with blocking of the previously scanned stages to prevent feedback of the scanning signals.

In addition, in the known path checking and selection systems scanning of the links between the respective stages of the switching matrix is carried out with the given input and given output of the switching matrix marked with ground and with negative potential, respectively, requiring that a junctor or outgoing trunk which is to be connected at the output of the switching matrix be selected prior to initiation of the path checking and selecting operation. In such cases, after the junctor or outgoing trunk is selected, if no path can be found from the marked input to the marked output of the switching matrix, either a reentry operation through other sections of the switching matrix must be initiated to provide a path to the selected junctor or outgoing trunk at the marked output of the switching matrix or another available junctor or outgoing trunk must be selected and the path finding operation restarted to prevent abandonment of the call.

The present invention provides a path selecting and checking system for determining a free path through a switching matrix from a marked input to a marked output having a junctor or outgoing trunk circuit, as may be required, available thereto. In avoiding the disadvantages inherent in known systems, the present invention provides a path finding system wherein the allotting of a junctor or outgoing trunk circuit forms an integral part of the overall path finding operation, so that the selection of a final link in the path to the output of the switching matrix is accomplished with assurance that a junctor or outgoing trunk will be available to the selected path. In fact, as provided by the present invention, the allotting of a junctor or outgoing trunk forms the last step of the checking and selection of links in the switching matrix so that the allotting operation, in addition to providing an available junctor or outgoing trunk circuit, also completes the path through the switching matrix.

Another basic feature of the present invention resides in the provision of a path checking and selection system for a multi-stage switching matrix having more than one path between a given input and a given output wherein only a single scanning operation in the switching matrix is necessary. In this way, the complexity of the equipment necessary to effect the path checking and selection is considerably reduced, thereby increasing the overall reliability of the system while reducing the complexity and cost thereof.

The switching matrix to which the present invention relates is a three-stage matrix having a line circuit servicing a plurality of individual stations associated with each A stage switch. An individual path selector is connected to the output of each A stage switch for selectively applying scanning signals to the links between the A and B stages from a matrix scanner in the common control. A feature of the present invention resides in the restriction of scanning to the output of that A stage switch associated with the station requesting service by requiring the enabling of a path selector from the line circuit associated with the A stage switch before scanning signals can be applied to the interstage links extending therefrom. Thus, the A stage switch through which the path will extend and whose output will be scanned by the matrix scanner in the common control is automatically determined by enabling of the individual path selector associated with that switch from the line circuit servicing the station requesting service.

Another advantageous feature of the present invention resides in the detection at the inputs to each C stage switch of the scanning signals applied through the designated path selector of those free paths which extend to each C stage switch. At this point, no output of the switching matrix to which the path must extend has been designated since the allotting of a junctor or outgoing trunk has not been accomplished. Instead, the indications from the various path detectors connected to the inputs of the C stage switches designating the availability of a path to those points are applied to the respective junctor or trunk controls as one of the conditions determining the availability of junctors or outgoing trunks which may be connected to an output of the respective C stage switches. In this way, the allotting of a junctor or outgoing trunk circuit is dependent upon its having a free path to the calling station, and automatically establishes the last link in the path through the switching matrix.

It is a principal object of the present invention to provide a path checking and selection system for a multi-stage switching matrix which eliminates or satisfactorily avoids the disadvantages inherent in similar systems known heretofore.

It is another object of the present invention to provide a path checking and selection system of the type described which is capable of performing a path finding operation with a single scan in the switching matrix, thereby reducing the complexity and increasing the reliability of the system.

It is a further object of the present invention to provide a path checking and selection system of the type described which makes possible full availability of the paths through the switching matrix by combining the allotting of junctors and outgoing trunks with the path finding operation.

It is a further feature of the present invention that if any combination of a free path and trunk or junctor exists which can serve a calling station, it is assured that the calling station will be served.

It is still a further feature of the present invention that the connection of a calling station to an available trunk or junctor is accomplished in a single path finding and allotting process and not on a trial and error basis.

It is still another object of the present invention to provide a path checking and selection system of the type described which is capable of performing the necessary path finding function with a minimum of equipment thereby reducing the cost of the system and its operation.

These and other objects, features and advantages of the present invention will become more apparent from the following detailed description thereof when taken in conjunction with the accompanying drawings which illustrate one exemplary embodiment of the present invention, and wherein;

FIG. 1 is a schematic block diagram of a common control telephone system incorporating the features of the present invention;

Figure 6:
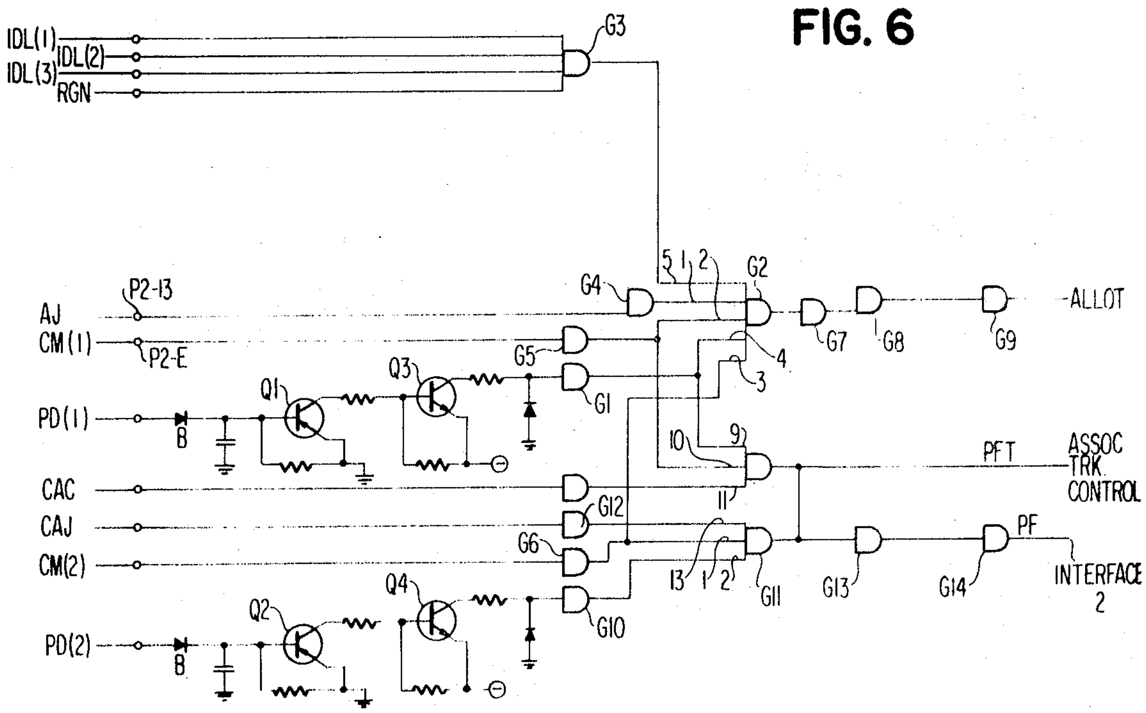
Figure 3A:
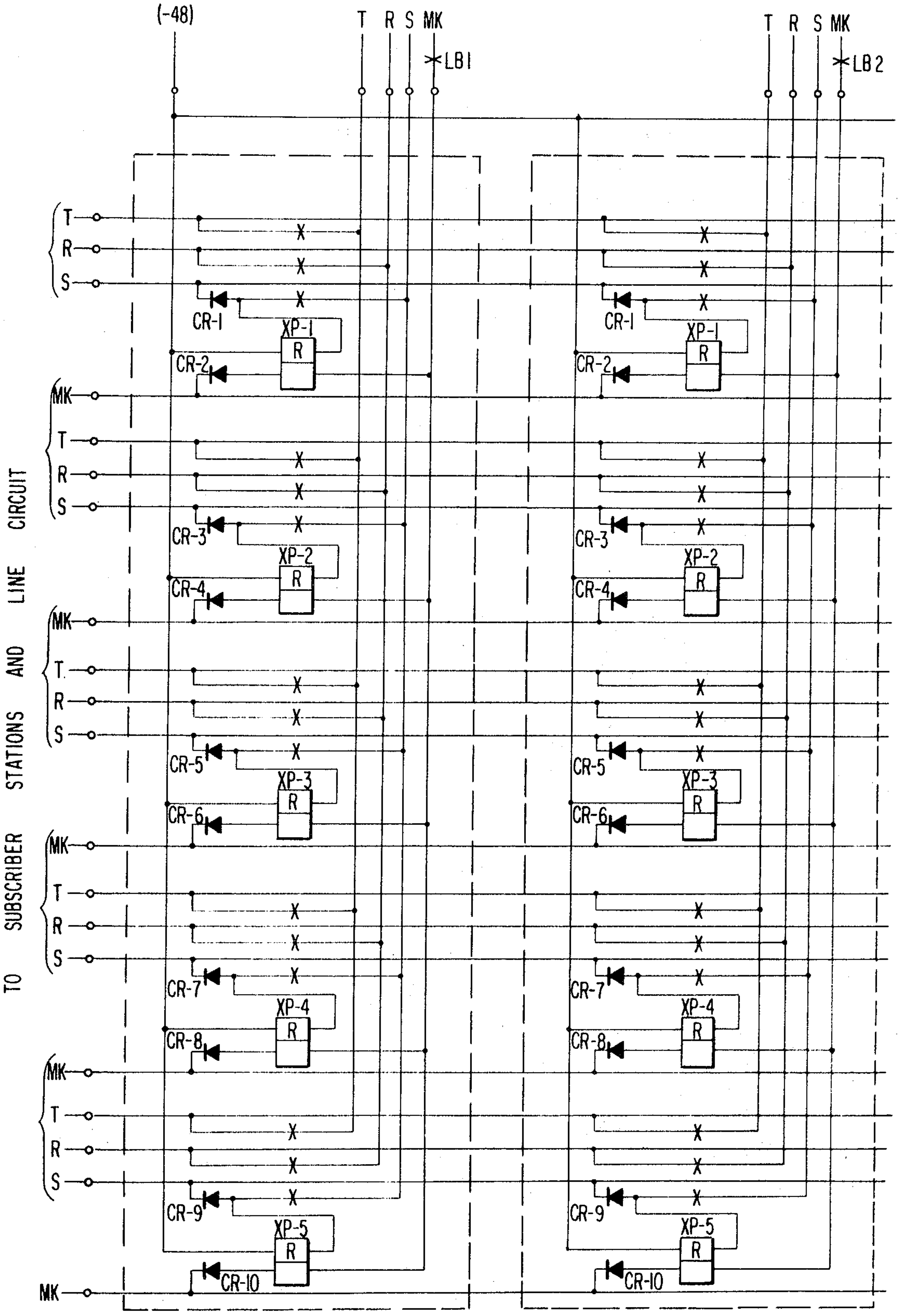
Figure 3B:
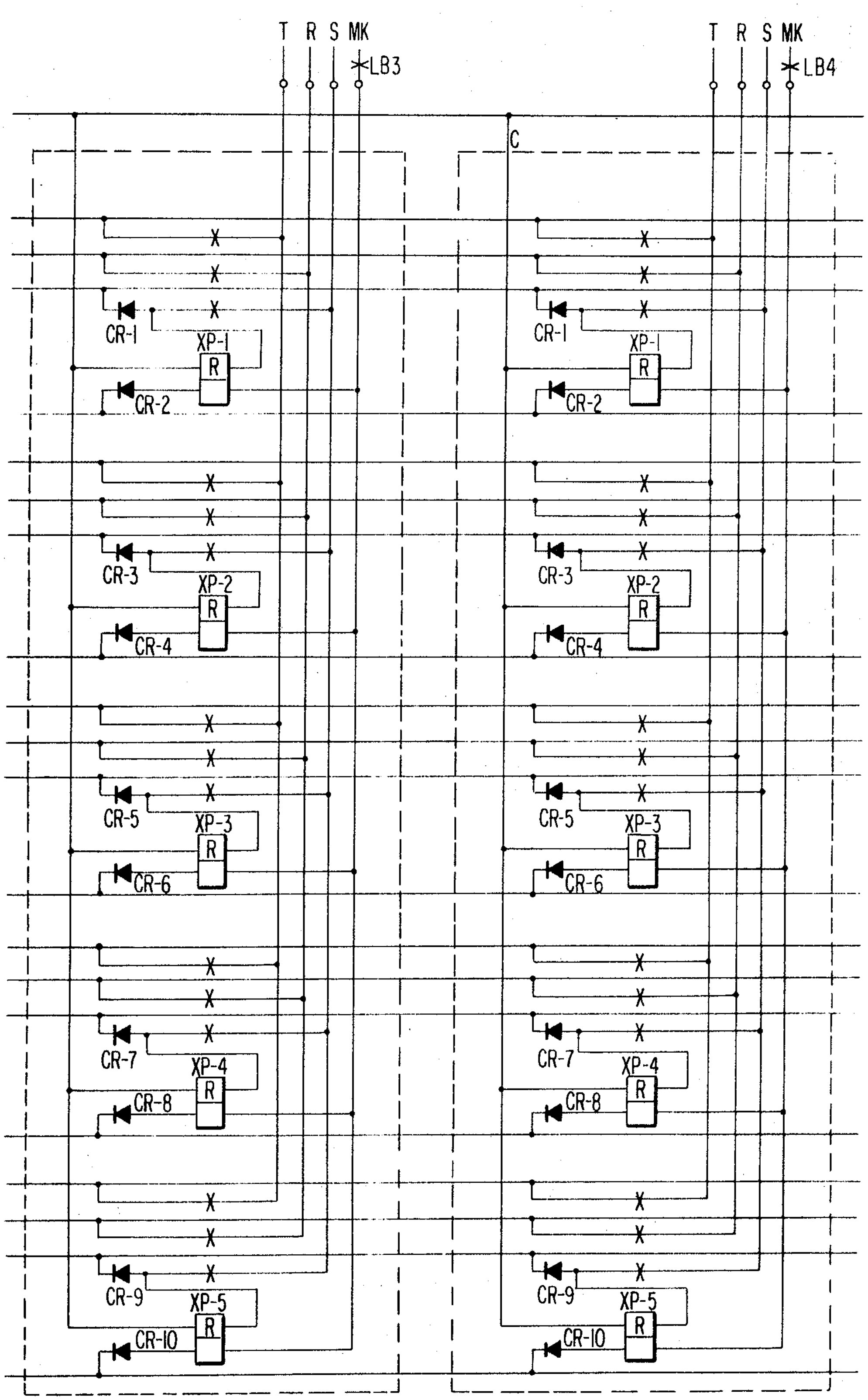
Figures 4, 5:
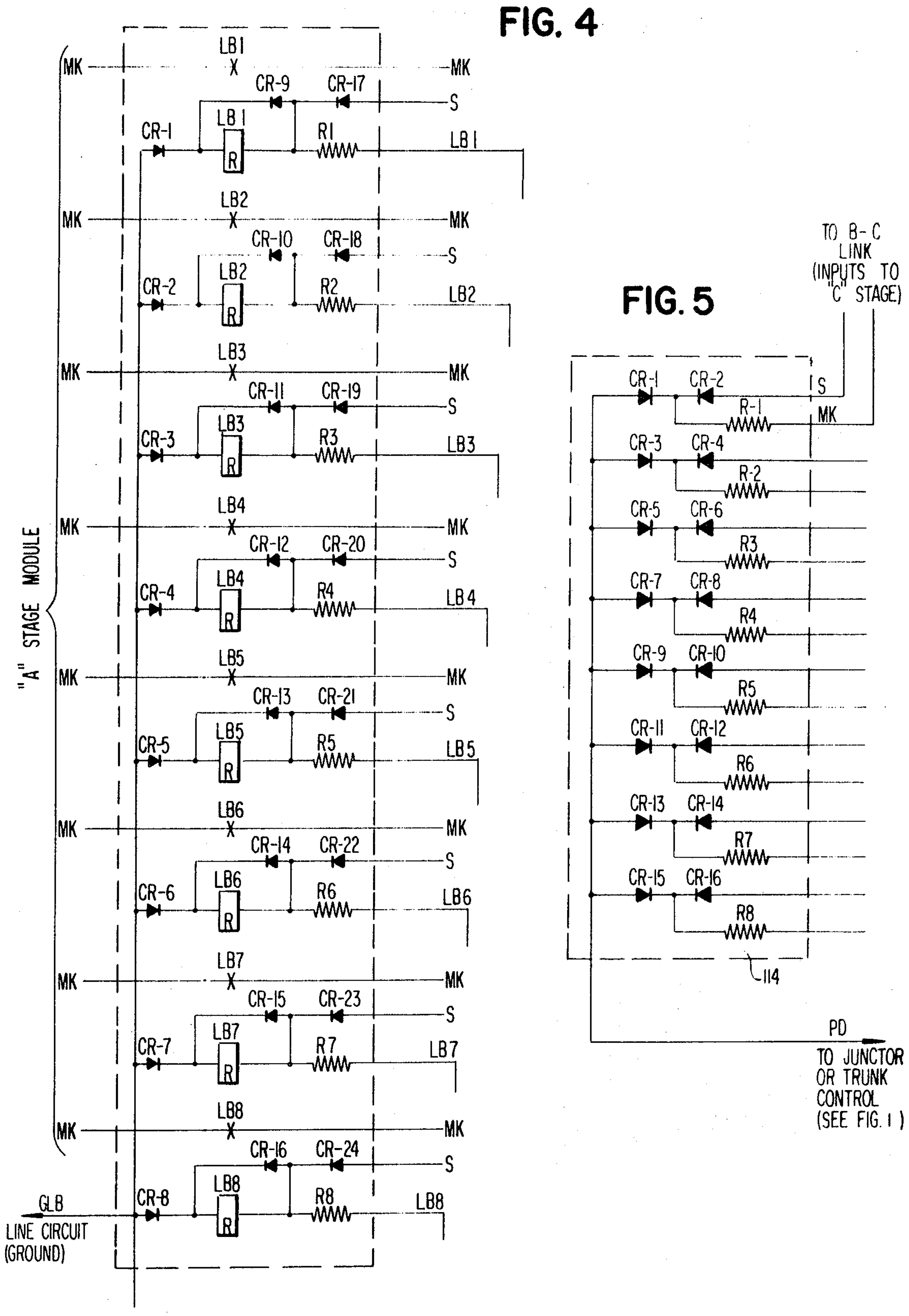
Figure 7A:
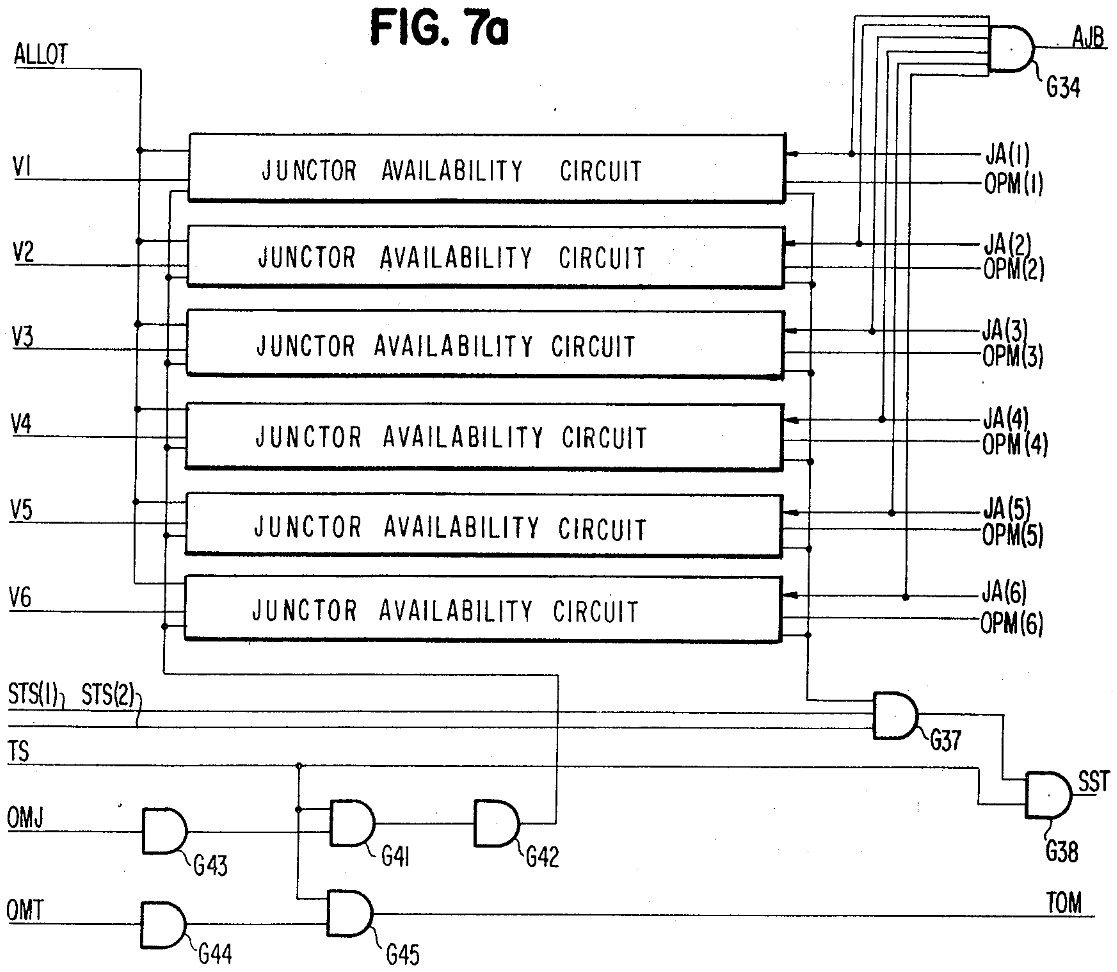
Figure 7B:
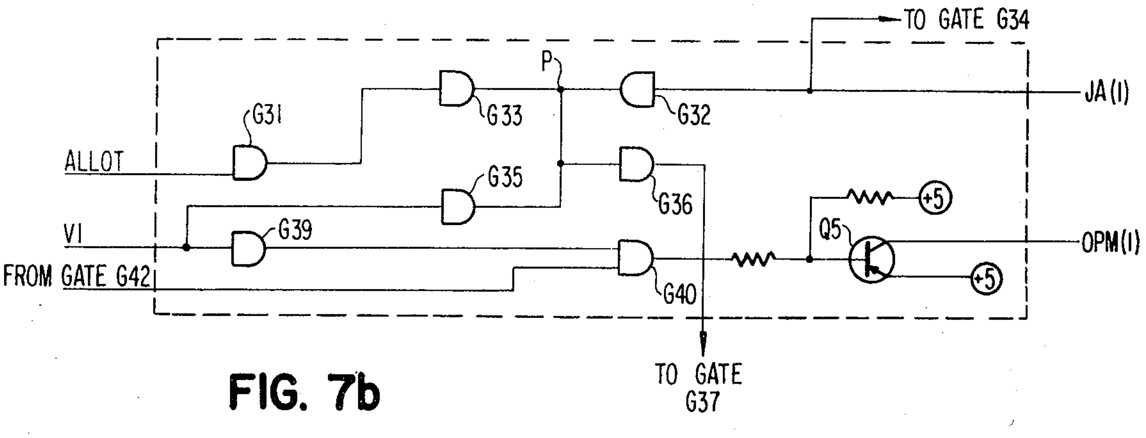

FIGS. 3*a* and 3*b*, when combined, form a portion of a typical matrix switch;

FIGS. 4 and 5 are schematic circuit diagrams of a typical path selector and a typical path detector, respectively; and FIGS. 6, 7*a* and 7*b* are schematic circuit diagrams of portions of a typical junctor control of the type provided by the present invention.

The path checking and selecting system in accordance with the present invention is disclosed specifically herein in connection with a switching matrix of particular configuration; however, it should be apparent to those familiar with such systems that the size of the switching matrix, including the number of matrix switches provided in each stage and the number of junctors and outgoing trunk circuits available to the switching matrix, is determined by the size, complexity and traffic requirements of the system. Thus, while a specific embodiment has been disclosed herein to clearly indicate the general principles of the present invention, it should be understood that these principles are equally applicable to matrices of different sizes by simple extension of the principles described.

The junctor circuits provided in the system disclosed herein into which the present invention has been incorporated may be of the programmed type such as disclosed in U.S. application Ser. No. 552,283, of James Gordon Pearce et al., filed May 28, 1966, now U.S. Pat. No. 3,487,170 or of the non-programmed type such as disclosed in copending U.S. application Ser. No. 587,491, filed Oct. 18, 1966, in the name of William W. Pharis, now U.S. Pat. No. 3,496,303, both applications being assigned to the same assignee as the present application. However, it should also be apparent from the following description of the invention that these junctor circuits may also take the form of known originating and terminating junctor circuits. In addition, the common control associated with the system including the present invention is disclosed by way of example only to facilitate the understanding of the principles of the invention. It should therefore be understood that other common control systems than the one specifically disclosed may be utilized in accordance with the teachings of the present invention.

FIG. 1 illustrates an overall block diagram of a common control PBX system capable of connecting one station to another station or to the central office via a trunk circuit under control of the common control circuits. The system provides a plurality of stations 100 (of which only a single station is illustrated in FIG. 1 for purposes of simplicity) with each group of 10 stations 100 being serviced by a line circuit 101 associated with a particular A stage switch of the switching matrix 110. The switching matrix 110 consists of three stages A, B and C of reed relay switches providing a plurality of paths between a given input connected to one of 10 stations associated therewith and a given output connectable to a junctor 115 or central office trunk 118. All of the switching functions of the system are controlled by the common control circuits 120 which control the functions for an off-hook program, a read register program and a trunk demand program. Associated with each C stage matrix switch of the switching matrix 110 is a junctor control 125 or a trunk control 130 along with a plurality of registers 135. One or more tone dial converters 138 are available to the registers 135 for conversion of multifrequency tones. A class of service panel 102 is provided for each line circuit 101 and indicates for the respective stations served by the line circuit special classes of service which are available for these stations.

The common control 120 is divided into several separate functional circuits which serve to control the program of operations carried out to perform the switching processes including the path checking and selection in accordance with the present invention. A line control circuit 103 accommodating 10 line circuits 101 serves as an interface between the common control 120 and the individual line circuits 101. The common control 120 typically includes a program control 121 which selects the program to be run to satisfy the request for service and a program sequencer 122 and program circuit 123, which implement the program selected by the program control 121. The program control 121, program sequencer 122 and program circuit 123 may typically take the form of a wired logic or other programmed system of the type well known in the art. The various control signals eminating from this program control area of the common control 120 have not been illustrated in detail since the arrangement and functioning of such elements do not directly relate to the present invention and such systems are conventionally provided in several forms in the known prior art.

The common control 120 also includes a line scanner 124 which determines the line demanding service on an originating call and identifies and acts as a line marker when terminating a call. A digit store 125 and a translator 126 are also provided as part of the common control 120 and serve the functions normally associated with such elements. A register scanner 127 examines the register-senders to determine if an idle register or outgoing register-sender is available for use in connection with a calling station or to find the register demanding service to complete a call. A trunk scanner 128 and matrix scanner 129 are associated with the path selecting and checking operation in accordance with the present invention, the matrix scanner 129 serving to provide scanning signals through a path selector 112 in the switching matrix 110 to be detected by a path detector 114 and the trunk scanner 128 serving to scan the junctors 115 and central office trunks 118 through the junctor control 130 or trunk control 132 to determine those which may be available to a calling station through the switching station 110.

In order to provide attendant service in the system, an attendant's register 140 and turret 141 are connected to the central office trunks 118 and registers 135 to provide service for incoming and outgoing calls. Also associated with the central office trunks 118 are one or more outgoing register senders 150 and a toll restrictor 155 which provide for special types of service, such as conversion of multifrequency signalling to dial pulses, abbreviated dialing and toll restriction. Features of the outgoing register sender 150 and toll restrictor 155 are disclosed in greater detail in copending application Ser. No. 57,550, filed July 23, 1970.

Figure 2:
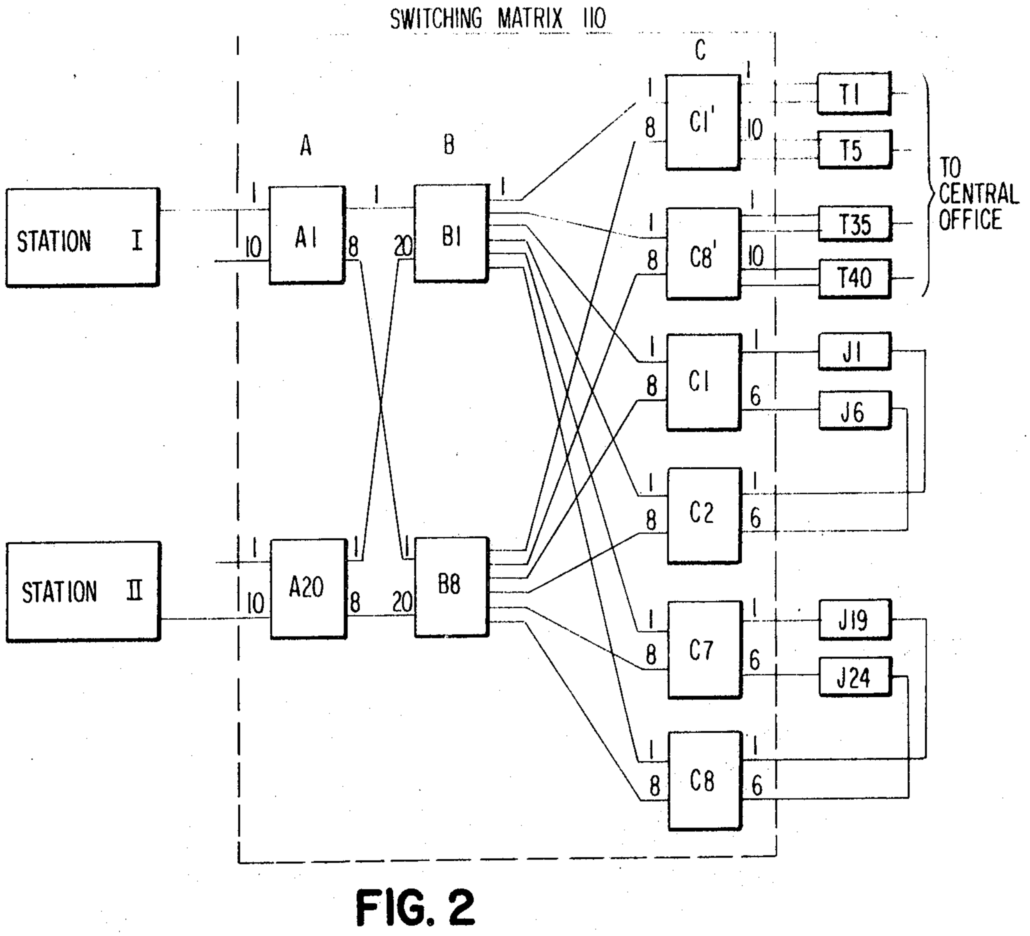
FIG. 2 is a more detailed schematic circuit diagram of a switching matrix to which the present invention is applicable.

FIG. 2 illustrates one example of the switching matrix 110 formed of three stages A, B and C of switches. The A stage of the switching matrix 110 can be considered as a line stage since each of the switches A1 through A20 have their inputs connected to respective stations, such as stations I and II. The B stage of the switching matrix 110 is a mixing stage providing interconnection between each output of an A stage switch and each C stage switch. The C stage of the switching matrix is the trunk stage with the output of the respective switches of the stage being connected to central office trunks T1 through T40 or to junctors J1 through J24.

The basic A stage switch is a 10 × 8 switch—10 lines in and 8 lines out. While the links between the respective stages of the matrix, as illustrated in FIG. 2, indicate only a single conductor, it should be understood that each link is a four wire arrangement including the standard tip T and ring R leads for carrying the telephone communication and the mark MK and sleeve S leads which are used for the path checking and selecting operation and for holding the communication connection until termination is to be effected.

FIGS. 3*a* and 3*b*, when combined provide a schematic circuit diagram of a modular part of a matrix switch. For example, a combination of four modules as provided in these figures will comprise a typical 10 × 8 A stage switch. It is noted that each of the inputs on the left in FIG. 3*a* consists of four lines T, R, S and MK and each of the outputs at the top of the figures also consists of four lines T, R, S and MK. The corresponding lines of each input are connected typically to like lines in each output through contacts of an associated XP relay so that each set of input lines may be selectively connected to any one set of output lines by actuation of the proper XP relay. Path finding is accomplished with the mark leads MK which connect through a winding of the XP relays via one of the even numbered diodes CR2–CR10 and holding of the actuated condition of the XP relay is effected by connection of ground to the sleeve lead S connected through one of the windings thereof and an odd number diode CR1–CR9 to negative battery.

As illustrated in FIG. 2, each output from a given A stage switch will connect to a respective one of the eight matrix switches in the B stage. Thus, each A stage switch has one output to each of the switches B1 through B8 in the B stage of the matrix. Similarly, each of the B stage switches has one link into each C stage switch so that the number of paths between a given input and a given output of the switching matrix 110 is equal to the number of matrix switches provided in the B stage thereof. In the illustrated example, up to eight paths may be available between a given station at the input of this switching matrix 110 and a given junctor or trunk circuit at the output of the switching matrix depending on the availability of the links.

In order to perform the path finding operation in accordance with the present invention, a junctor control circuit is provided for each group of six junctors associated with a given C stage matrix switch. For example, in FIG. 2 it is noted that each of the six outputs of the matrix switch C1 is associated with a respective junctor J1 through J6, the outputs thereof are connected back to the outputs 1 through 6 of the switch C2. Thus, the switch C1 serves as an originating switch and the switch C2 receiving the outputs of the junctors J1 through J6 serves as a terminating switch. The same is true of the switches C7 and C8, respectively, associated with the junctors J19 through J24. Thus, where station I seeks to establish connection with station II, a path may be found through an originating switch, such as switch C1, and return via one of the junctors J1 through J6 through the terminating switch C2. On the other hand, if station I desires to call outside of the system, a path may be found through either one of the trunk switches C1′ through C8′ via the trunk circuits T1 through T40 to the central office.

In spite of the fact that the switching matrix 110 is a three stage matrix, the path checking and selection operation in accordance with the present invention essentially seeks only two conditions in the switching matrix 110. The path finding basically relies upon the principle that if an idle link between stage A and stage B and a matching link between stage B and stage C can be found it is certain that a complete path is available through the switching matrix from the station requesting service because the A stage cross points associated with a given line serve only that line. Therefore, the line requesting service has access to idle cross points within the A stage itself, and the same holds true in the C stage in connection with the trunk circuits and junctors.

Looking once again to FIG. 1, since the A stage switch through which the path must extend is fixed by the station requesting service, it is necessary to check the links extending from this module to the B stage switch, which is accomplished by a path selector 112, and to simultaneously check the available matching links between the B and C stages, which is accomplished by a path detector 114. As indicated above, when available matching links between the respective stages extending to the A stage switch associated with the station requesting service are detected, it is determined that at least one path through the switching matrix 110 is available. A path detector 114 is provided at the inputs for each C stage switch so that detection of a scanning signal applied through path selector 112 and appearing at the input to the respective C stage switch indicates that an available path to that switch exists, which is signified by an output from the path detector 114 to the junctor control 130 or trunk control 132 associated therewith. If the junctor control 130 or trunk control 132 at this time determines that one or more available junctors (or trunks as the case may be) associated with the output of the particular C stage switch are free for service, then it is known that not only a free path through the switching network is available but the path is connectable to a free junctor or trunk, as required.

The matrix scanner 129 in the common control 120 is connected to all of the path selectors 112 associated with the respective A stage switches of the switching matrix 110. Since each station 100 in this system is connected to only a single input of a particular A stage switch, scanning of the links between the A and B stages can be confined to the output of the particular A stage switch associated with the station 100 requesting service. Scanning is restricted to a particular A stage switch by enabling only the path selector 112 connected to the output thereof so that the scanning signals derived from the marked input of the switch are applied sequentially only to the eight output lines from the designated switch. This enabling of the particular path selector 112 is accomplished from the line circuit 101 serving the station 100 requesting service.

The scanning of the switch output from the matrix scanner 129 produces a successive enabling through the path selector 112 of the eight output lines of the selected A stage switch. As a given link is enabled the scanning pulse will pass to a single B stage matrix switch, as clear from FIG. 2, and then fan out to all of the C stage switches, providing that the A to B stage link is free and all of the B to C stage links from the particular B stage switch are also free. Obviously, if not all of the B to C stage links are available, the scanning pulse will be received at the input of only certain select ones of the C stage switches.

When a scanning pulse reaches the input of a particular C stage switch, the path detector 114 will detect presence of the scanning pulse and indicate on its output line to the junctor control 130 or trunk control 132 detection of matching links forming a complete path through the switching matrix 110 to the input of a C stage switch associated with the path detector 114. If all of the B to C stage links are available so that the scanning pulse reaches the input of all of the C stage switches, then all of the path detectors 114 will provide an output to the junctor control 130 or trunk control 132 associated therewith. Of course, if only select ones of the C stage switches receive the scanning pulse at the input thereof, then only the path detectors 114 associated therewith will provide an output to the junctor control 130 or trunk control 132 indicating detection of a path to this point in the switching matrix 110.

As already indicated, information is continually received in the junctor control 130 and trunk control 132 as to the availability of the junctors 115, central office trunks 118 and registers 135 associated therewith, so that when a signal is received from the path detector 114 associated with the particular junctor control 130 or trunk control 132 indicating detection of a path to the input of a C stage switch, and the junctor control 130 or trunk control 132 has a junctor 115 and a register 135 or central office trunk 118 available for connection to this path through the C stage switch at the same time that the common control 120 indicates the desirability of providing such a connection, the matrix scanner 129 will be stopped so that the desired connection can be effected.

Of course, when a connection through the switching matrix 110 is desired, a path from a particular station at the input of the matrix may extend to any one of the C stage switches, these paths being detected by the path detectors 114 associated with the particular C stage switches; but, extension of the path through certain C stage switches may not be desirable. For example, if station I desired to communicate with station II, the desirability of extending the path through the C stage switches C1′ through C8′ is eliminated since these switches are connected only to outgoing trunk circuits T1 through T40. However, in scanning the links in the switching matrix 110 path detectors 114 associated with the switches C1′ through C8′ may indicate presence of a free path to the input of these switches to the trunk controls 132 associated therewith. Thus, it is necessary for the common control 120 in this case to limit control of the selection process to the junctor controls 130, which are associated only with the switches C1 through C8. Thus, while a path detection signal may be received in a trunk control 130 from the path detector 114 associated therewith, the trunk control 132 is incapable of responding since it does not receive an enabling signal from the common control 120. The same type of selection between the junctor controls 130 and trunk controls 132 would be provided in the case of outgoing calls, in which case the common control 120 would enable the truck controls 132 but not enable the junctor controls 130. The manner in which this is effected will be described in more detail hereinafter.

A circuit diagram of a typical path selector 112 is illustrated in FIG. 4. Since the path selector connected to the outputs of a respective A stage switch serve to sequentially supply a scanning pulse to each of these outputs, the path selector must be individually connected to each of the outputs of the switch. Enabling of a given path selector 112 is accomplished by applying ground to the line GLB from the associated line circuit 101, which ground mark is then applied to one side of each of the relays LB1 through LB8 via the common bus 113. With actuation of the matrix scanner 129 in the common control 120, negative battery is sequentially applied to each of the lines LB1 through LB8 thereby actuating the relays in sequence via the resistances R1 through R8, respectively. As the relays LB1 through LB8 are actuated, the contacts thereof in the mark lead MK extending between the A and B stages of the switching matrix 110 are closed. In this way, a negative potential mark on the line side of the switching matrix 110 from the line circuit 101 is extended by closing of the LB contacts in the mark lead through the A and B stages of the switching matrix 110 along those paths available for use.

Where a link between stages of the switching matrix 110 is presently in use, a ground will be conventionally applied along the sleeve lead S, having the holding windings for the matrix cross points connected thereto, so as to maintain a communication connection through the switching matrix. Thus, if the link associated with the first MK lead in FIG. 4 is busy, a ground will be provided on the S lead associated therewith, which ground will extend to the point between diodes CR17 and CR9 thereby providing ground on both sides of the relay LB1, preventing operation of the relay in response to the negative battery applied from the scanner to the line LB1. Accordingly, as the scanner applies negative battery to the LB leads in the path selector 112, the LB relay in these lines will be actuated only if no ground mark appears on the S lead associated therewith. Thus, only the available links at the output of the switch are scanned.

FIG. 5 illustrates in greater detail a typical path detector 114, provided for each of the C stage switches. The path detector 114 is very similar in configuration to the path selector 112; however, the path detector does not include relays having contacts in the mark leads since the purpose of the path detector is merely detection of the extended negative potential mark rather than scanning of the leads to the associated C stage switch. The respective S and MK leads from the path detector extend to the sleeve S and mark MK lines between the B and C stages, the connections from the path detector being provided at the inputs of a particular C stage switch. If the negative potential mark extending through the switching matrix 110 appears on a mark lead MK at the input of a C stage switch, it will extend to a detection point in the path detector, such as the point between diodes CR1 and CR2 via a resistance R1. If the B–C link associated with this mark lead is busy, a ground will be present on the sleeve lead S so that the negative potential mark on the mark lead MK under these conditions will not extend along the common bus to the output line PD of the path detector.

The path checking and selection operation in accordance with the present invention which enables the combination of those free paths extending from a given A stage switch to the various inputs of the C stage switches will now be described in connection with FIGS. 1–5. When a subscriber at a given station 100 lifts the hand-set of a telephone, a loop is closed to the tip T and ring R leads of the line which signals the associated line circuit 101. A demand is placed through the associated line control circuit 103 to the common control 120 for an off-hook program, and the common control causes the line scanner 124 to scan over the lines to identify the particular line requesting service. Upon identifying the line requesting service, a class of service check is made through the COS panel 102 to determine if the line has a rotary dial class of service or a multi-frequency class of service, information which is necessary to determine whether a tone dial converter 138 is necessary or not in the establishment of the call.

The common control 120 causes the line circuit 101 to place a negative potential mark on its mark lead, which is connected to an input of the particular A stage switch associated with the station requesting service. At the same time, the common control 120 causes the line circuit 101 to extend an enabling ground via line GLB to the path selector 112 associated with the particular A stage switch whose input is marked. At this point, it should be noted that the negative potential mark applied from the line circuit 101 to the input of the A stage switch passes to all of the outputs of the switch, but does not extend further due to the open contacts of the path selector 112 in each of the links extending from the outputs of this switch, as seen in FIGS. 3*a* and 3*b*.

The common control 120 then actuates the matrix scanner 129 which successively applies negative battery to the leads LB1 through LB8 in the path selector 112. For those links which are available for connection, characterized by the absence of a ground on the sleeve lead S thereof, the LB relay, connected in series between the line from the matrix scanner and the line GLB marked with ground from the line circuit 101, will operate closing the contacts in the associated mark lead MK so as to allow the negative potential mark flowing from the input of the switch to pass to the B and C stages. The lines LB1 through LB8 are successively scanned one at a time allowing sufficient time at each line to permit detection of a path through the network, if one should exist. Assuming that the link between the first output of the switch A1 and the first input of the switch B1 is idle, upon application of negative battery to the line LB1 from the matrix scanner 129, the relay LB1 will operate closing the contacts in the associated mark lead MK. Thus, the negative potential mark at the input of the switch $A_1$ will extend through the switch $B_1$ to the first input of all of the switches C1′–C8′ and C1 through C8 in the C stage of the switching matrix. Some of the links between the B and C stage switches may be busy, as evidenced by the appearance of ground potential on the sleeve lead S associated with these links. Thus, in each of the path detectors 114 associated with the respective C stage switches, a negative battery mark will appear at the first MK lead thereto via the resistance $R_1$. If the link is free for acquisition, no ground mark will appear on the S lead associated with this first input to the associated path detector; however, if the link is busy, ground will appear on the sleeve lead S. Assuming the link is free, the negative potential mark will pass through the path detectors 114 associated with these switches to the output PD thereof, extending to the respective junctor control associated with these switches. It should be noted at this point that the availability of a link is determined by whether a ground appears on the sleeve lead S associated therewith rather than by opening the link, as done in prior systems.

The appearance of the negative potential mark on the output line PD from one or more path detectors 114 indicates that at least one free path exists from a given marked A stage input to an input of a C stage switch. In practice, during normal traffic conditions, it can be expected that a number of paths will be available through the switching network. However, if an output is provided at none of the path detectors 114 as a result of the scanning of the first output from the given A stage switch, the scanner will step to the second output, which in the illustrated example would extend through the second switch B2 (not shown) in the switching matrix, and the inputs of the C stage switches would again be monitored by the respective path detectors 114. The matrix scanner 129 will continue to step from one line to another at the output of the given A stage switch until at least one path detector 114 produces an output indicating detection of an available path.

When an output is received from a path detector at the junctor control 130 or trunk control 132, we know certain information concerning the available path detected through the switching matrix 110. As already indicated, we know the A stage switch through which the connection will be made from the line circuit since the station requesting service is connected only to a single input of a particular A stage switch. We also know, from the line to which the matrix scanner 129 is connected, which cross point in the A stage switch is involved and which B stage switch is involved. However, a particular link from the B stage switch to a C stage switch has not as yet been selected. If we can find an available junctor or trunk, as may be required, associated with a C stage switch accessible to one of the free links detected by the path detector 114 associated therewith, the C stage switch and the cross point therein will at that point be determined.

The information from the path detectors 114 is applied to the junctor control 130 or trunk control 132 along with information as to idle junctors in the group served by the junctor control, idle registers available to those junctors, and if need be, a tone converter. All of the information needed concerning the circuits required for establishing the call comes together in the junctor control or trunk control which then selects the various circuits to be interconnected in accordance with the service request of the calling station. It should be noted that a quantity of junctor controls may be involved since the mark flows out of an A stage switch and fans out through the B and C stages to the available junctors and trunks. Thus, in the system illustrated in FIG. 2 where two junctor controls and two trunk controls are required, the availability of paths to all of the C stage switches will involve all of the junctor controls and the trunk controls.

FIG. 6 illustrates a portion of a typical junctor control, providing the logic circuitry necessary to analyze the information concerning the availability of paths, junctors, and registers. As already indicated, in the system described by way of example, each junctor control serves six junctors, which are in turn associated with the six outputs of a single C stage switch having a single path detector 114 connected to the inputs thereof. The output signal from the path detector 114 associated with an originating C stage switch is applied to the PD (1) input of the junctor control as a negative potential capable of rendering the transistor $Q_1$ conductive, whereupon the transistor $Q_3$ is also rendered conductive. This results in enabling of the input 4 to the AND gate $G_2$ via the gate $G_1$. At the same time, the condition of the three registers which can serve a particular group of junctors associated with the junctor control is monitored at the inputs IDL (1) through IDL (3). A ground on any of these three leads, or on the lead RGN indicating that no register is necessary, to the OR gate $G_3$ enables the line 5 at the input of the AND gate $G_2$. Control is also received from the common control 120 at the input AJ indicating that it is a junctor rather than a trunk which is to be connected to a C stage output. As indicated previously, the negative potential applied at the input of the A stage is capable of fanning out to all of the C stage switches, and since some of these switches are allocated only to trunks rather than junctors, it is necessary to selectively enable either the junctor controls or the trunk controls depending upon the requirements of the call. Thus, an input from the common control 120 to the AJ input of the junctor control enables the junctor control for connection of a junctor to the C stage. The input CM (1) provides interlock control for the C stage indicating that the switches in the C stage are plugged in and ready for service. A similar input CM (2) indicates that the terminating C stage matrix switch for the group of junctors associated with the junctor control are plugged in.

Thus, the AND gate $G_2$ receives five inputs relating to the five conditions necessary to indicate the availability of a path and all of the circuits necessary for establishing the requiring call. An output from the gate $G_2$ is applied via gates $G_7$, $G_8$ and $G_9$ to the junctor availability circuits requesting that a junctor be allotted.

The circuit illustrated in FIG. 7 represents the portion of the junctor control which monitors the status of the six junctors served by the particular junctor control and includes the junctor availability circuits. In other words, at the time that an output appears on the ALLOT output from the logic circuitry of FIG. 6, it still has not been determined that an idle junctor is available in this group. Consequently, the circuitry of FIG. 7*a* provides individual junctor availability circuits for the six junctors of the group. An input JA (indicating junctor available) is provided to the junctor availability circuits for each of the six junctors associated with the particular junctor control. If a junctor is available for connection to the switching matrix 110, a ground will be applied from the junctor to the JA lead in the junctor control.

Looking to the logic circuitry for the first junctor availability circuit of the group, as seen in detail in FIG. 7*b*, a ground applied at the input JA (1) will be applied to a wired AND gate formed by gates $G_{30}$, $G_{32}$ and $G_{36}$. The ground at the input of gate $G_{30}$ will be converted to positive potential at point P, while positive potential applied on the input ALLOT from the circuitry of FIG. 6 applied via gates $G_{31}$ and $G_{32}$ also provides a positive potential at point P.

Inputs $U_1$ through $U_6$ to the junctor control, as seen in FIG. 7*a*, are connected to the trunk scanner 128 in the common control 120. The normal condition for the trunk scanner when not actuated is to provide a ground on each of the outputs thereof, so that a ground on lead $U_1$ will be applied through gate $G_{35}$ which produces a positive potential at point $P_1$.

Thus, all the connections to point $P_1$ provide positive potential, thereby enabling the gate $G_{36}$ so that a ground appears at the input of gate $G_{37}$. Under this condition, the gate $G_{38}$ is enabled providing an output on line SST instructing the common control 120 to stop the matrix scanner 129. It should be noted that more than one junctor may be available at the time a request for allotting is applied to the input ALLOT, and for each junctor that is available, a ground will be applied to the input of gate $G_{37}$; however, only one junctor need be available to effect a stopping of the matrix scanner 129.

At this stage of the operation, it is known that at least one free path exists through the switching matrix 110 from a given A stage matrix switch to a C stage switch having a free junctor associated therewith. In fact, not only may a plurality of junctors be available to a given originating C stage switch, but available paths to more than one C stage switch having available junctors associated therewith will involve more than one junctor control. Thus, to complete the allotting portion of the operation, which provides for final determination of the last link in the path through the switching matrix 110, it is first necessary to scan the junctor controls to see which is capable of completing the path to a free junctor.

The trunk scanner, which also serves for scanning junctors, provides for scanning in two steps, i.e., it first scans groups of junctors by scanning the junctor controls associated therewith, and then in a second step scans the individual junctors of a selected group associated with one junctor control to select one free junctor from that group. The trunk scanner 128 provides a TS output to each of the junctor controls 130. In the non-actuated state, the TS leads from the trunk scanner all provide a positive potential, whereas, upon actuation, the trunk scanner provides ground on all of the TS outputs except one which carries positive potential. The scanning then occurs by switching the positive potential sequentially from one TS lead to the next. Thus, for the junctor control illustrated in FIG. 7*a*, until the control is scanned, a ground will appear on the TS lead which will prevent enabling of the gate $G_{38}$ in spite of the fact that gate $G_{37}$ is still enabled via the common bus from the individual junctor availability circuits.

When the trunk scanner scans the particular junctor control, the TS lead receives positive potential which corresponds to the positive potential at the output of gate $G_{37}$, if a free junctor is associated with this junctor control, and accordingly, the gate $G_{38}$ will be enabled to provide an output on line SST to stop the trunk scanner. The trunk scanner 128 will then automatically pass to its unit scan operation wherein the input lines $U_1$ through $U_6$ select a single available junctor.

As indicated above, when the trunk scanner is not actuated, ground is applied to all of the leads $U_1$ through $U_6$. Thus, beginning with the lead $U_1$, ground will be applied sequentially while the remaining leads will be provided with positive potential. For example, as seen in FIG. 7*b*, if a ground is applied by the scanner to input $U_1$, it will pass the gate $G_{39}$ where it is applied as a positive potential to the input of gate $G_{40}$. If the TS lead still receives positive potential, indicating that the scanner has selected this junctor control, gates $G_{41}$ and $G_{42}$ will be enabled applying positive potential to the other input of gate $G_{40}$, thereby enabling the gate and actuating the transistor $Q_5$ so as to place an output on line OPM. The output on line OPM is applied to the junctor and serves to operate an access relay therein which gives the common control 120 direct access into the junctor so that it is able to perform the subsequent switching operations necessary to complete the circuit. The junctors are then marked toward the registers, and the register scan is initiated to obtain one of the free registers associated with the junctor. Marking is also sent out to obtain an available tone converter, if necessary.

When all of the associated circuits have been acquired, a low resistance ground will be applied through one of the contacts of the access relay in the junctor to the mark lead MK connected to the output side of the C stage switch, which in combination with the negative potential mark at the input to the A stage switch will actuate the appropriate cross points in the A, B and C stages of the matrix 110. A holding ground is then applied from the junctor to the sleeve lead S to hold the contacts along the selected path, thereby preventing acquisition of any of the links thereof for other paths through the network.

The foregoing description relates to the acquisition of a path through the switching matrix from a calling station to an available junctor. However, it should be understood that the same procedure relates also to the connection from a calling station to an out-going trunk, the trunk controls 132 providing for indication of an available trunk and selection thereof in substantially the same manner as described in connection with junctor control 130.

Similarly, the terminating connection from the output of a junctor through the switching matrix to a called station is carried out in exactly the same manner as described above. In this case, since the particular junctor is already known, the C stage switch through which the terminating portion of the call extends is also known as is the path detector 114 associated with that switching module. The common control 120 marks the line circuit associated with the called station so that the path selector 112 associated with the A stage switch to which the called station is connected is enabled. The common control causes the particular junctor in question to apply a ground on lead CAJ to its associated junctor control. This ground at the input of gate G12 provides a positive potential at an input to AND gate G11, thus allowing the associated junctor control, and no other, to send a signal to the common control when a free path is detected. The common control 120 then actuates the matrix scanner 129 and the path detector 114 associated with this terminating portion of the call looks for the presence of the negative potential mark extending through the matrix to the input of the particular C stage switch involved. If a path is free through the switching matrix, the path detector will provide the negative potential on the input line PD (2) of the junctor control, as seen in FIG. 6. This will operate the transistors $Q_2$ and $Q_4$ to enable the gate $G_{10}$ providing an input to the AND gate $G_{11}$. If the C stage switching module is properly plugged in, an interlock signal will be received on input CM (2) enabling the gate $G_6$ and providing the final input to the gate $G_{11}$. This results in enabling of the gates $G_{13}$ and $G_{14}$ providing an output on line PF to the common control 120, which then applies a low resistance ground to the output of the junctor closing the cross points in the switching matrix 110 to complete the path to the called line circuit.

Connection of an incoming trunk call to a called station is accomplished in substantially the same manner as the terminating connection of a junctor just described.

Although the present invention has been described with reference to but a single embodiment, it is to be understood that the scope of the invention is not limited to the specific details thereof, but is susceptible of numerous changes and modifications as would be apparent to one with normal skill in the pertinent technology.

What I claim is:

1. In a common control telephone system, a path checking and selecting arrangement for establishing a path through a multi-stage switching matrix from a selected input to an available one of a plurality of connection circuits comprising
path selection means for detecting all paths available from said selected input to an intermediate point of said matrix, and
allotting means responsive to said path selection means for selecting an available connection circuit associated with an output of the matrix capable of completing one of the available paths detected by said path selection means.

2. A system as defined in claim 1, wherein said connection circuits at least include junctors, trunks and registers, said allotting means including control means associated with respective groups of matrix outputs for detecting the simultaneous availability of a junctor and register or a trunk associated with a group of matrix outputs to which at least one available path determined by said path selection means is extendable.

3. A system as defined in claim 2, wherein said matrix includes three stages of switches each having a plurality of inputs connectable to any one of a plurality of outputs, said path selection means including a respective path selector connecting the outputs of each first stage switch to an input of each second stage switch for allowing the passage of scanning signals therebetween and a respective path detector connected to each of the inputs of a respective one of each third stage switch for detecting scanning signals passed by said path selectors.

4. A system as defined in claim 3, wherein said control means includes a plurality of control circuits, each control circuit monitoring the availability of the connection circuits associated with the outputs of a single respective third stage switch, a respective one of each of said path selectors being connected to a respective one of said control circuits, and common control means responsive to detection of a free control circuit and indication of an output of a path selector in a given control circuit for marking the output of the third stage switch associated with said free control circuit thereby establishing a path through the matrix thereto from said selected input.

5. A system as defined in claim 3, wherein each path through said matrix includes at least a mark lead for determining the availability of each part of the path between stages and a sleeve lead for holding a completed path once acquired by connection of ground thereto, said path selection means including circuit means responsive to the presence of a ground on the sleeve lead of a path for preventing passage of a scanning signal on the mark lead thereof.

6. A system as defined in claim 5, wherein said path detectors include blocking means responsive to the presence of a ground on the sleeve lead of a path for preventing passage of a scanning signal from the mark lead therethrough.

7. In a common control telephone system including a plurality of communication stations, a multi-stage switching matrix providing a plurality of paths from a selected input to each output thereof, a plurality of connection circuits in the form of junctors for interconnecting selected stations through said matrix and trunk circuits for establishing through said matrix outgoing connections from a selected station, and common control means including a plurality of registers for controlling the functioning of said connection circuits, a path checking and selecting arrangement for establishing a path through said matrix from a selected input to an available one of a plurality of connection circuits, comprising
line control means for marking a single selected input of said matrix to which a station requesting service is connected,
path selection means for extending said mark from said selected input on all available paths through said matrix, path detection means connected in said matrix prior to the last stage thereof for generating a control signal in response to detection of the extending mark, and allotting means responsive to receipt of a control signal for selecting an available connection circuit associated with an output of the matrix capable of completing one of the available paths detected by said path selection means.

8. A system as defined in claim 7, wherein said matrix includes three stages, each stage of said matrix including a plurality of switches, each capable of connecting each switch input to any output of the same switch, each input of a first stage switch being connected to a respective station and each output thereof being connected to a respective input of each second stage switch, each output of a second stage switch being connected to a respective input of each third stage switch, the outputs of which are each connected to a respective connection circuit.

9. A system as defined in claim 8, wherein each path through said matrix includes at least an availability lead for determining the availability of each portion of the path between stages and a holding lead for holding a completed path once acquired by connection of ground thereto, said path selection means including a path selector connected to the holding leads at the output of each first stage switch for enabling the associated availability leads individually and in sequence only when no ground is detected on the associated holding lead.

10. A system as defined in claim 9, wherein each path selector includes a plurality of relays, each relay having contacts in a respective one of said availability leads at the output of a first stage switch, and scanning means for sequentially actuating said relays so as to complete the connection through the associated availability lead, and means connecting said relays to the associated holding leads so as to prevent actuation thereof by said scanning means when a ground is present thereon.

11. A system as defined in claim 10, wherein each path selector is connected to said line control means for actuation exclusive of the other path selectors to permit scanning of the outputs of a single first stage switch to which said station requesting service is connected.

12. A system as defined in claim 10, wherein said path detection means includes a respective path detector connected to the inputs of each third stage switch between each of said availability and holding leads so as to pass the mark extending from the selected input of the matrix as said control signal when at least one path to the respective switch has a holding lead free of ground connection.

13. A system as defined in claim 12, wherein said allotting means includes a control circuit associated with the group of connection circuits connected to each respective third stage switch, each control circuit including means for monitoring the availability of said connection circuits and stop scan means responsive to receipt of a control signal from the path detector connected thereto and the availability of at least one connection circuit in the associated group for stopping said scanning means.

14. A system as defined in claim 13, wherein said common control means includes connection circuit scanning means for scanning the availability of individual connection circuits in the respective groups associated with said control circuits and additional stop scan means in each control circuit for stopping said circuit scanning means in response to detection of a single available connection circuit in the selected group.

15. A system as defined in claim 12, wherein each path detector includes a detection circuit connected to each input of the third stage switch having a first diode connected between said holding lead and a switching point, a second diode connected between an output of the detection circuit and said switching point with opposite polarity to said first diode and a connection between said availability lead and said switching point.

16. A system as defined in claim 7, wherein each path through said matrix includes at least an availability lead for determining the availability of each portion of the path between stages and a holding lead for holding a completed path once acquired by connection of ground thereto, said path selection means including a path selector connected to the holding leads at the output of each first stage switch for enabling the associated availability leads individually and in sequence only when no ground is detected on the associated holding lead.

17. A system as defined in claim 16, wherein each path selector includes a plurality of relays, each relay having contacts in a respective one of said availability leads at the output of a first stage switch, and scanning means for sequentially actuating said relays so as to complete the connection through the associated availability lead, and means connecting said relays to the associated holding leads so as to prevent actuation thereof by said scanning means when a ground is present thereon.

18. In a common control telephone system including a multi-stage switching matrix having a plurality of matrix switches provided with a plurality of interconnectable switch inputs and switch outputs in each stage and links between stages connecting respective switch outputs of one stage to respective switch inputs of an adjacent stage, a path checking and selecting arrangement for establishing a path through said multi-stage switching matrix from a selected matrix input to an available matrix output, comprising line control means for marking said selected matrix input with a potential, path selection means responsive to said line control means for sequentially enabling only selected outputs of the matrix switch whose input is marked with a potential, and path detection means connected to the inputs of the matrix switches in the last stage of said multi-stage switching matrix for disabling said scanning means in response to detection of said mark potential only at selected inputs of one of said last stage switches.

19. A system as defined in claim 18, wherein said matrix includes three stages, each stage of said matrix including a plurality of switches connecting each input thereof to all of the outputs thereof, each input of a first stage switch forming a matrix input and each output thereof being connected to a respective input of each second stage switch, each output of a second stage switch being connected to a respective input of each third stage switch.

20. A system as defined in claim 18, wherein each path through said matrix includes at least an availability lead for determining the availability of each portion of the path between stages and a holding lead for holding a completed path once acquired by connection of ground thereto, said path selection means including a path selector connected to the holding leads at the output of each first stage switch for enabling the associated availability leads individually and in sequence only when no ground is detected on the associated holding lead.

21. A system as defined in claim 20, wherein each path selector includes a plurality of relays, each relay having contacts in a respective one of said availability leads at the output of a first stage switch, and scanning means for sequentially actuating said relays so as to complete the connection through the associated availability lead, and means connecting said relays to the associated holding leads so as to prevent actuation thereof by said scanning means when a ground is present thereon.

22. A system as defined in claim 21, wherein each path selector is connected to said line control means for actuation exclusive of the other path selectors to permit scanning of the outputs of a single first stage switch to which said station requesting service is connected.

23. A system as defined in claim 22, wherein said path detection means includes a respective path detector connected to the inputs of each third stage switch between each of said availability and holding leads so as to pass the mark extending from the selected input of the matrix as said control signal when at least one path to the respective switch has a holding lead free of ground connection.

24. A system as defined in claim 23, wherein each path detector includes a detection circuit connected to each input of a third stage switch having a first diode connected between said holding lead and a switching point, a second diode connected between an output of the detection circuit and said switching point with opposite polarity to said first diode and a connection between said availability lead and said switching point.

25. In a common control telephone system, a path checking and selecting arrangement for establishing a path through a three-stage switching matrix from a voltage marked input to an available output comprising path scanning means for enabling only those portions of paths between said marked input and the second stage of said three-stage matrix which are available for use, and path detecting means for detecting only on those portions of paths between the second and third stages of said three-stage matrix the voltage from said marked input.

26. A system as defined in claim 25, wherein said path scanning means includes individual relays each having contacts in a respective one of the paths between said marked input and the second stage of said three-stage matrix, means for sequentially enabling said individual relays and means responsive to detection of the busy condition of a path between the first and second stages of said three-stage matrix for blocking the enabling of individual relay having contacts in this path.

27. A system as defined in claim 26, wherein said path detecting means includes detection circuits connected to those portions of paths between the second and third stages of said three-stage matrix, each detection circuit having diode means responsive to a voltage indicating the busy condition of a respective path portion between the second and third stages for blocking passage of the voltage mark from said marked input.

28. A system as defined in claim 27, further including a plurality of connection circuits for selective connection to an output of said matrix and allotting means for selecting an available connection circuit associated with an output of the matrix capable of completing one of the available paths detected by said path detecting means.

29. A system as defined in claim 28, wherein said allotting means includes coincidence means responsive to the simultaneous indication of availability of a connection circuit associated with a path connected to a detection circuit capable of passing the voltage mark from the marked input for disabling said means for sequentially enabling said individual relays.

30. A system as defined in claim 28, wherein said connection circuits at least include junctors, trunks and registers, said allotting means including control means associated with respective groups of matrix outputs for detecting the simultaneous availability of a junctor and register or a trunk associated with a group of matrix outputs to which at least one available path determined by said path selection means is extendable.

* * * * *

UNITED STATES PATENT OFFICE
CERTIFICATE OF CORRECTION

PATENT NO. : 3,660,600

DATED : May 2, 1972

INVENTOR(S) : Ernest O. Lee, Jr.

It is certified that error appears in the above-identified patent and that said Letters Patent are hereby corrected as shown below:

Col. 13, line 66 After "said" insert ---connection---.

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*